(No Model.)

C. BEARD & C. E. BALDWIN.
FRAME FOR PURSES.

No. 284,364. Patented Sept. 4, 1883.

WITNESSES:
W. T. Robertson.
W. Turner.

INVENTORS:
Cornelius Beard
Chas E Baldwin
By T. W. Robertson,
ATTORNEY.

UNITED STATES PATENT OFFICE.

CORNELIUS BEARD AND CHARLES E. BALDWIN, OF NEW YORK, N. Y.

FRAME FOR PURSES.

SPECIFICATION forming part of Letters Patent No. 284,364, dated September 4, 1883.

Application filed July 10, 1883. (No model.)

*To all whom it may concern:*

Be it known that we, CORNELIUS BEARD and CHARLES E. BALDWIN, citizens of the United States of America, residing at New York, in the county of New York and State of New York, have invented certain new and useful Improvements in Frames for Purses, &c., of which the following is a specification, reference being had therein to the accompanying drawings.

This invention relates to an improvement in the clasps or frames of purses, hand-bags, satchels, &c.; and it consists in the peculiar construction and arrangement of parts hereinafter more particularly described and claimed.

Figure 1:
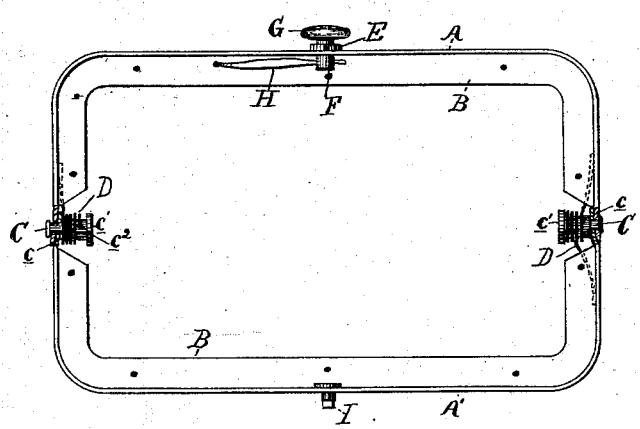
Figure 2:
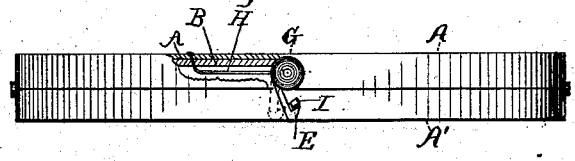
Figure 3:

In the accompanying drawings, Figure 1 shows a plan of our frame, represented fully open; Fig. 2, a similar view with the frame closed, partly broken away; and Fig. 3 is an enlarged detached view of the rivet.

A A' represent the outer or main portion of the frame, which is provided with the inner frame, B B, in the usual manner.

C is a peculiarly-formed rivet, having a shoulder at $c$ and a head at $c'$, which head holds on the shank of the rivet a spiral spring, D, whose opposite ends are passed between the main and inner frame, as shown in dotted lines in Fig. 1, by which means the spring and its two ends are securely held in place. If preferred, instead of having both ends of the spring pass under the frame, a hole may be made in the rivet at $c^2$ and one end of the spring inserted therein.

At E is a hook fastened to a pin, F, provided with a head, G, which pin is passed through the frame A, and is held there by a spring, H, one end of which fits in and passes through a hole in the pin, and the other is riveted to the frame, whereby the hook E is normally held in the position shown in Fig. 2. On frame A' is a pin, I, over which the hook F catches when the frame is closed, thus securely holding the two parts of the frame together, and as the hook is held in the locked position by the spring H, it is impossible for the frame to accidentally open. When, however, it is desired to open the frame, a slight turn of the head G will turn the hook to one side, as shown in dotted lines in Fig. 2, when the force of the spring D will cause the frame to open, as shown in Fig. 1. It will be observed that the outer surface of the pin I, over which the hook catches, is at a slight angle to the sides of the frame, and that the hook is formed with a corresponding angle on its inner side, and as the spring D tends to force the frame apart, it tends to keep the inclines of the hook and pin in contact and prevent any tendency of the opening of the frame should the spring H become inoperative, and thus under any and all circumstances the frame remains securely fastened, but can be readily opened when desired.

We do not limit ourselves to the exact form shown, as it is evident that the head may be flattened on top or on the sides, or altogether dispensed with, and that the hook may be set inside the frame, instead of outside, if preferred.

What we claim as new is—

1. In combination with a frame for purses or analogous articles, the hook E, secured to a pin, F, passing through the frame, and held in a locked position over the pin I by a spring, H, passing through the pin F, substantially as described.

2. The combination, with the frame A A' and the spring D, of the rivet C, having a shoulder, $c$, substantially as described.

3. The combination of the frame A A' and spring D with the hook E and pin I, substantially as and for the purpose specified.

In testimony whereof we affix our signatures, in presence of two witnesses, this 7th day of July, 1883.

CORNELIUS BEARD.
CHARLES E. BALDWIN.

Witnesses:
JNO. B. STEWART,
J. H. GREATFIELD.